US012452109B2

(12) United States Patent
Fakoorian et al.

(10) Patent No.: US 12,452,109 B2
(45) Date of Patent: Oct. 21, 2025

(54) CHANNEL ESTIMATION USING ARTIFICIAL INTELLIGENCE

(71) Applicant: Apple Inc., Cupertino, CA (US)

(72) Inventors: Seyed Ali Akbar Fakoorian, San Diego, CA (US); Dawei Zhang, Saratoga, CA (US); Haitong Sun, Cupertino, CA (US); Huaning Niu, San Jose, CA (US); Oghenekome Oteri, San Diego, CA (US); Sigen Ye, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 20 days.

(21) Appl. No.: 17/756,852

(22) PCT Filed: Jun. 7, 2021

(86) PCT No.: PCT/CN2021/098673
§ 371 (c)(1),
(2) Date: Jun. 3, 2022

(87) PCT Pub. No.: WO2022/256981
PCT Pub. Date: Dec. 15, 2022

(65) Prior Publication Data
US 2024/0406036 A1   Dec. 5, 2024

(51) Int. Cl.
*H04L 25/02* (2006.01)
*H04L 5/00* (2006.01)

(52) U.S. Cl.
CPC ........ *H04L 25/0254* (2013.01); *H04L 5/0048* (2013.01); *H04L 25/0204* (2013.01); *H04L 25/0226* (2013.01)

(58) Field of Classification Search
None
See application file for complete search history.

(56) References Cited

U.S. PATENT DOCUMENTS

2019/0042936 A1* 2/2019 Guim Bernat ......... G06N 3/063
2020/0028647 A1   1/2020 Kim et al.
(Continued)

FOREIGN PATENT DOCUMENTS

WO   2021/051362   3/2021

OTHER PUBLICATIONS

Intel Corporation, "Use cases, AI/ML algorithms, and general concepts", 3GPP TSG RAN WG3 Meeting #110e, R3-206403, Nov. 13, 2020, 6 sheets.

*Primary Examiner* — Srinivasa R Reddivalam
(74) *Attorney, Agent, or Firm* — Fay Kaplun & Marcin, LLP (57) ABSTRACT

A user equipment (UE) is configured to perform channel estimation. The UE operates in a current channel estimation mode comprising either one of a first mode or a second mode, wherein the first mode comprises receiving first reference signals (RS) having a first RS overhead and wherein the second mode comprises receiving second reference signals (RS) having a second RS overhead, receives a network indication to switch from the current channel estimation mode to a new channel estimation mode comprising the other one of the first mode or second mode, transmits an acknowledgment to the network that the network indication was received and switches from the current channel estimation mode to the new channel estimation mode in accordance with the network indication.

18 Claims, 6 Drawing Sheets

(56) References Cited

U.S. PATENT DOCUMENTS

| | | |
|---|---|---|
| 2020/0366326 A1 | 11/2020 | Jassal et al. |
| 2021/0204312 A1* | 7/2021 | Zhang ................... H04W 72/23 |
| 2022/0225299 A1* | 7/2022 | Pezeshki ............... H04L 5/0053 |
| 2024/0046148 A1* | 2/2024 | Bega ...................... G06N 20/00 |

* cited by examiner

CHANNEL ESTIMATION USING ARTIFICIAL INTELLIGENCE

TECHNICAL FIELD

This application relates generally to wireless communication, and in particular relates to Channel Estimation Using Artificial Intelligence.

BACKGROUND

A user equipment (UE) may establish a connection to at least one of a plurality of different networks or types of networks. 5G New Radio (NR) has introduced many radio access network (RAN) and core network (CN) enhancements, as well as an enhanced security architecture. Channel estimation refers to a process for determining how a signal propagates through a wireless channel from a transmitter to a receiver, e.g. from a base station to a UE, and is an important aspect of achieving reliable communications between RAN entities. Accurate channel estimation for 5G NR RAN communications may be challenging, particularly for high-dimensional signals.

Artificial intelligence (AI) and/or machine learning (ML), e.g. a deep learning neural network, may be used for channel estimation, e.g. by a UE and/or by the network. An AI-based channel estimation typically involves a training phase, where received reference signals (RS) are used as training data to train a model, and an inference phase, where received RS are processed using the trained model to generate channel estimations. Additional training phases, e.g. retuning phases, may be used to retrain the model. However, the RS overhead, e.g., the RS density, required for training the model may be different from the RS overhead required for inferring a channel estimation. Thus, for a UE using AI-based channel estimation, it is important for the UE and the network to know whether the UE is in a training mode or in an inference mode and whether the UE should switch to a different mode.

SUMMARY

Some exemplary embodiments aspects are related to a processor of a user equipment (UE) configured to perform operations. The operations include operating in a current channel estimation mode comprising either one of a first mode or a second mode, wherein the first mode comprises receiving first reference signals (RS) having a first RS overhead and wherein the second mode comprises receiving second reference signals (RS) having a second RS overhead, receiving a network indication to switch from the current channel estimation mode to a new channel estimation mode comprising the other one of the first mode or second mode, transmitting an acknowledgment to the network that the network indication was received and switching from the current channel estimation mode to the new channel estimation mode in accordance with the network indication.

Other exemplary embodiments are related to a processor of a base station configured to perform operations. The operations include transmitting a network indication to a user equipment (UE) to switch from a current channel estimation mode comprising either one of a first mode or a second mode to a new channel estimation mode comprising the other one of the first mode or second mode, wherein the first mode comprises receiving first reference signals (RS) having a first RS overhead and wherein the second mode comprises receiving second reference signals (RS) having a second RS overhead, receiving an acknowledgment from the UE that the network indication was received and transmitting RSs in accordance with the new channel estimation mode of the UE.

DETAILED DESCRIPTION

The exemplary aspects may be further understood with reference to the following description and the related appended drawings, wherein like elements are provided with the same reference numerals. The exemplary aspects describe operations for supporting artificial intelligence (AI) and/or machine learning (ML) based channel estimation in a wireless network. The exemplary embodiments relate to signaling schemes for a user equipment (UE) and the network to communicate regarding various phases/modes of the AI-based channel estimation model, e.g., parameters for a training mode, where the model is to be trained by the UE based on input data comprising RS transmitted by the network, and parameters for an inference mode, where the model generates channel estimations/predictions using the trained model.

The exemplary aspects are described with regard to a UE. However, the use of a UE is provided for illustrative purposes. The exemplary aspects may be utilized with any electronic component that may establish a connection with a network and is configured with the hardware, software, and/or firmware to exchange information and data with the network. Therefore, the UE as described herein is used to represent any electronic component that is capable of accessing a wireless network and performing AI-based channel estimation for network communications, e.g. communications between the UE and a base station.

The exemplary aspects are described with regard to the network being a 5G New Radio (NR) network and a base station being a next generation Node B (gNB). However, the use of the 5G NR network and the gNB are provided for illustrative purposes. The exemplary aspects may apply to any type of network that utilizes similar functionalities.

The exemplary embodiments are further described with regard to artificial intelligence (AI) and/or machine learning (ML) based channel estimation. Any number of different AI/ML models may be used, depending on UE implementation. For example, a deep learning neural network may be used. Further, the various types of models may use different types of RS or different densities of RS for training the model, as well as different types/densities of RS for the inference phase of the channel estimation. Thus, reference to any particular AI-based channel estimation model is provided for illustrative purposes. The exemplary aspects may apply to any type of AI-based channel estimation model that uses a training phase and an inference phase, wherein the training/inference phases use different RS configurations as input data.

The exemplary embodiments are further described with regard to a reference signal (RS) training set comprising demodulation reference signals (DMRS). However, other RS may be used to train the AI/ML model, depending on UE implementation. For example, the RS training set may comprise channel state information (CSI) RS (CSI-RS) or other RS. Additionally, the RS used for the inference phase of channel estimation may comprise DMRS, CSI-RS or other RS. Thus, the RS being described as DMRS is provided for illustrative purposes. The exemplary aspects may apply to any type of RS that may be used for AI-based channel estimation.

Figure 1:
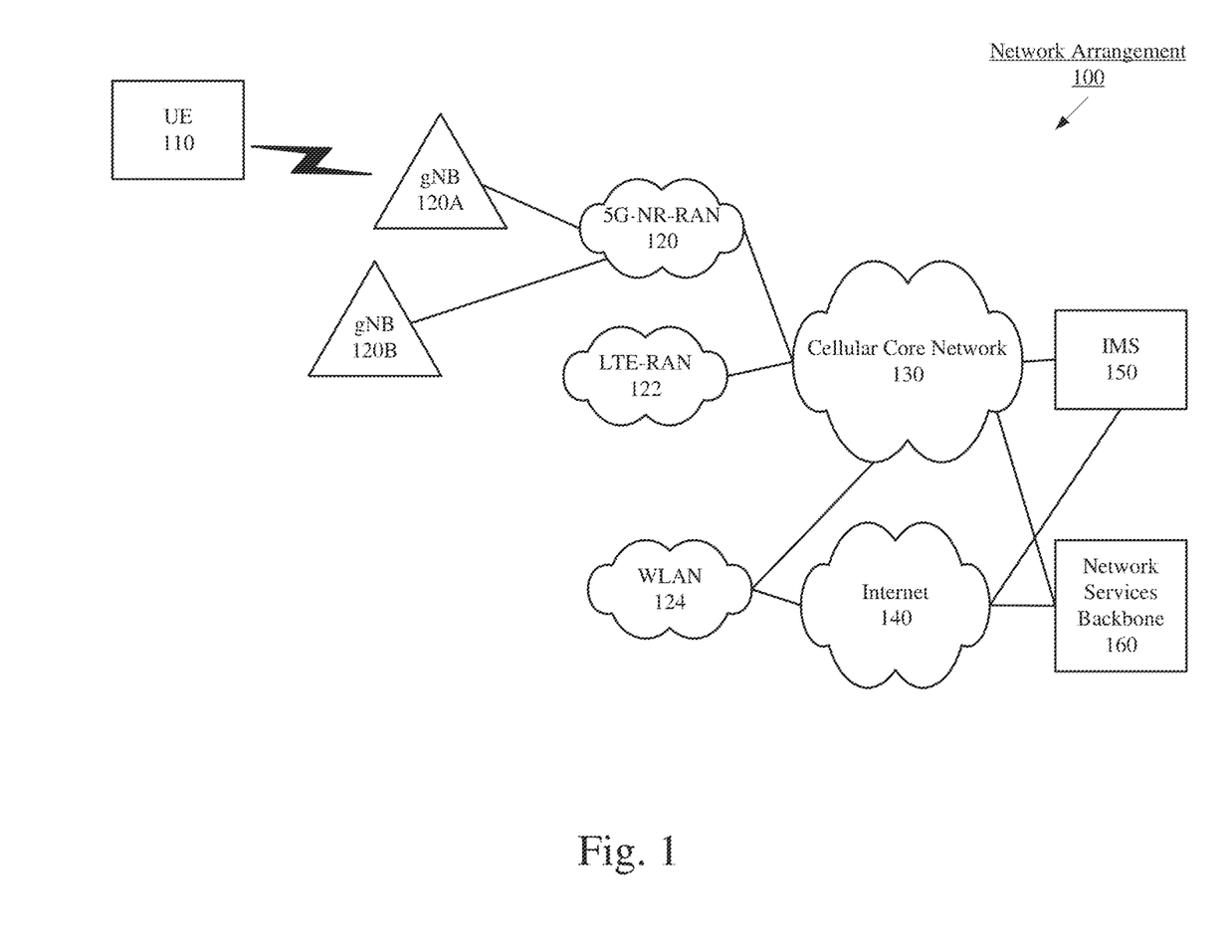
FIG. 1 shows a network arrangement according to various exemplary embodiments.

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g. legacy cellular networks) and the UE 110 may also communicate with networks over a wired connection. With regard to the exemplary aspects, the UE 110 may establish a connection with the 5G NR-RAN 122.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A and/or the gNB 120B. Reference to two gNBs 120A, 120B is merely for illustrative purposes. The exemplary aspects may apply to any appropriate number of gNBs.

In addition to the networks 120, 122 and 124 the network arrangement 100 also includes a cellular core network 130, the Internet 140, an IP Multimedia Subsystem (IMS) 150, and a network services backbone 160. The cellular core network 130, e.g., the 5GC for the 5G NR network, may be considered to be the interconnected set of components that manages the operation and traffic of the cellular network. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
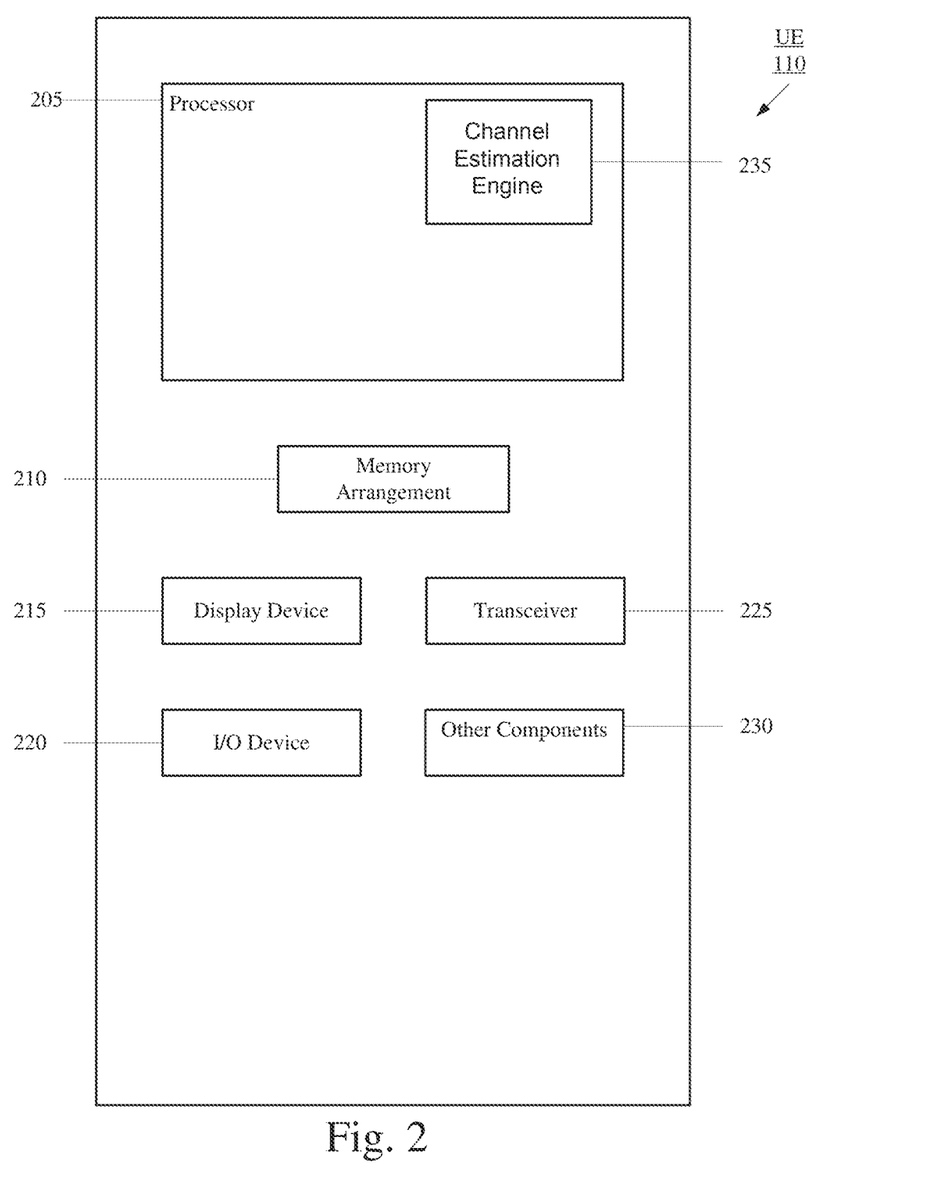
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. Additionally, the UE 110 may be configured to access an SNPN.

The processor 205 may be configured to execute a plurality of engines for the UE 110. For example, the engines may include a channel estimation engine 235 for performing operations related to entering and exiting a training phase of channel estimation and an inference phase of channel estimation. These operations will be described in greater detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary aspects may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
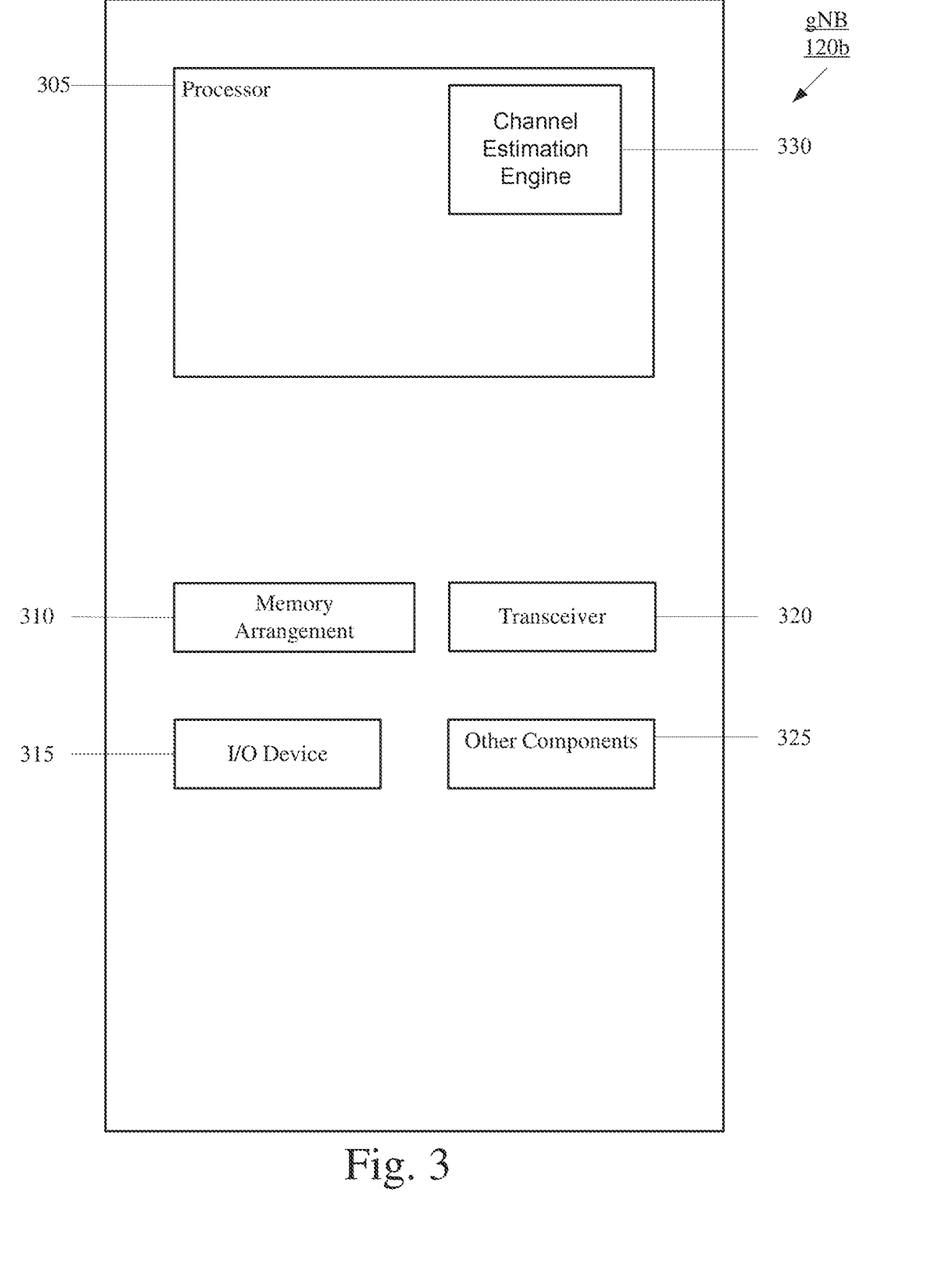
FIG. 3 shows an exemplary network base station according to various exemplary embodiments.

FIG. 3 shows an exemplary network base station, in this case gNB 120A, according to various exemplary embodiments. As noted above with regard to the UE 110, the gNB 120A may represent a serving cell for the UE 110. The gNB 120A may represent any access node of the 5G NR network through which the UE 110 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a channel estimation engine 335 for performing operations related to configuring a UE to enter and exit a training phase of channel estimation and an inference phase of channel estimation. These operations will be described in greater detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

AI/ML for Channel Estimation

Channel estimation refers to a process for determining how a signal propagates through a wireless channel from a transmitter to a receiver, e.g., from a base station to a UE, and is an important aspect of achieving reliable communications between RAN entities. Artificial intelligence (AI) and/or machine learning (ML), e.g., a deep learning neural network, have been introduced in 5G NR for communications between a user equipment (UE) and a next generation node B (gNB) to assist operations such as encoding/decoding, channel estimation, demodulation and estimation of interference plus noise.

An AI-based channel estimation typically involves a training phase, where received reference signals (RS) are used as training data to train a model, and an inference phase, where received RS are processed using the trained model to generate channel estimations.

Figure 4:
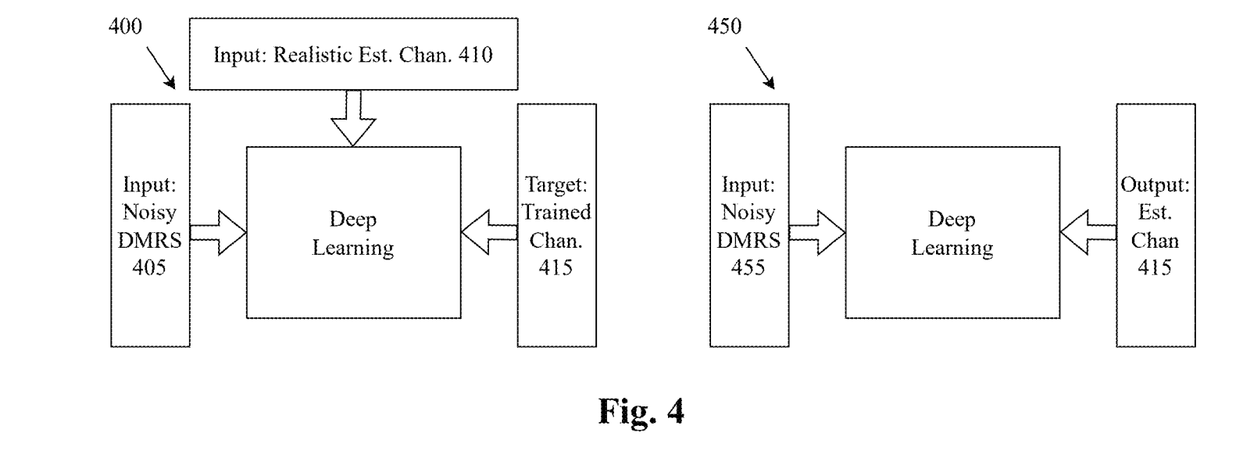
FIG. 4 shows an exemplary training phase for an AI-based channel estimation model and an exemplary inference phase for the AI-based channel estimation model.

FIG. 4 shows an exemplary training phase 400 for an AI-based channel estimation model and an exemplary inference phase 450 for the AI-based channel estimation model. In the training phase 400, the model receives noisy DMRS data 405 and one or more channel estimations 410 for the DMRS data, using known estimation methods. For example, a minimum mean squared error (MMSE) estimation may be used for estimating a received channel, while the DMRS data transmitted on the channel is used as training data. After a sufficient amount of training data and associated channel estimations are input into the model, a trained model 415 is output. In the inference phase 450, the model receives additional noisy DMRS data 455 as input and, using the trained model 415 directly outputs channel estimation data without processing the DMRS with a conventional channel estimation method such as MMSE.

However, the RS overhead, e.g., the RS density, required for training the model may be different from the RS overhead required for inferring a channel estimation. Thus, for a UE using AI-based channel estimation, it is important for the UE and the network to know whether the UE is in, or should enter, a training mode or an inference mode.

For AI/ML models, retuning is essential to maintaining system performance. For example, a trained model may perform poorly based on any number of reasons and require a new training phase. Thus, new training data may be gathered to re-train the model.

For various channel estimation AI/ML models, the training state (learning state), $\text{ChanEst}_{TRAIN}$, may have a different DMRS overhead than the inference state, ChanEst INFERENCE. For example, in the training state, a high density of DMRS may be configured to train the model.

Figure 5:
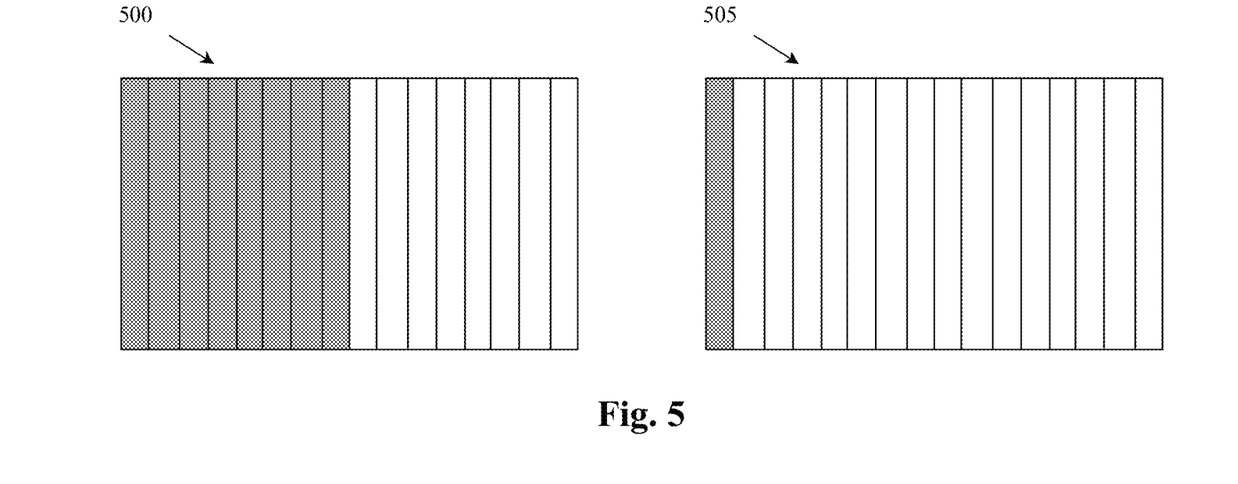
FIG. 5 shows an exemplary slot diagram for a PUSCH slot within the training phase of channel estimation and an exemplary slot diagram for a PUSCH slot within the inference phase of channel estimation.

FIG. 5 shows an exemplary slot diagram 500 for a PUSCH slot within the training phase of channel estimation and an exemplary slot diagram 505 for a PUSCH slot within the inference phase of channel estimation. In this example, in the training phase, the slot 500 comprises DMRS symbols in the first half of the slot 500. In other embodiments, the DMRS symbols may be in the entire slot, or multiple slots. In the inference phase, the slot 505 may comprise a DMRS symbol only for the first symbol of the slot 505. In other embodiments, there may be no DMRS used in the inference phase, e.g., to generate channel predictions. Thus, in this example, the DMRS density during the inference phase of channel estimation is less than the DMRS density during the training phase.

For training, a dense DMRS (or CSI-RS) slot may be introduced within the slots for learning. For inference, the DMRS overhead may be similar to current specifications for providing DMRS for channel estimation, or less (including no DMRS).

The implementation details for a particular UE for performing AI/ML-based channel estimation may depend on UE capability. For example, in one channel estimation model, the RS training set may have a different frequency domain resource allocation (FDRA) than the FDRA for an RS training set for a different channel estimation model. Additionally, the frequency domain (FD) range that may be inferred by a trained channel estimation model may be different from the FD range used to train the model.

In some embodiments, the model may be initially trained upon manufacture of the UE, or at some other time prior to user-activation of the UE. In some AI models, initial training requires a large amount of training data and processing for determining the various weights of the model parameters. This initial training process may not be practical to be performed by a UE that is already in service. Thus, the initial training process and the determination of the model weights may be determined prior to deployment of the UE, wherein some or all of the parameters for a fully trained model are hard-encoded on the UE.

A UE in the training phase/state for the channel estimation model is configured to receive and process a large number of reference signals (RS), e.g., DMRS or CSI-RS. This input data, in combination with various existing channel estimation processes, allows the AI model to determine the hyper-parameters for training the model. Once trained, the UE may enter an inference phase/state in which newly received RS are processed using the trained channel estimation model, or some other signal input data is used, and channel estimations/predictions are generated by the trained model without requiring any further channel estimation processes, e.g. MMSE.

According to some exemplary embodiments, the UE may indicate to the network a frequency domain (FD) range that the UE can infer for channel estimation from a given DMRS training set. For example, some UEs may implement a channel estimation model in which the channel estimation extends to a FD range corresponding to that of the DMRS training set, while other UEs may implement a model in which the channel estimation extends to a FD range different from that of the DMRS training set.

Figure 6A:
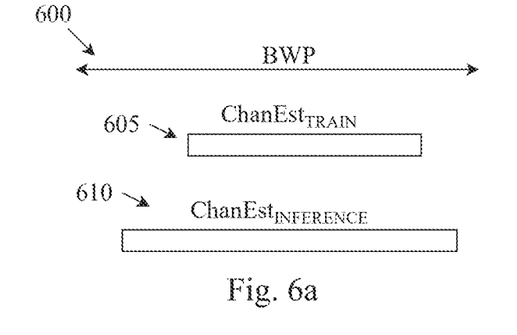
FIG. 6a shows an exemplary diagram for the FD range of the inference phase of a first AI-based channel estimation model.

FIG. 6a shows an exemplary diagram 600 for the FD range 610 of the inference phase of a first AI-based channel estimation model. The FD range 610 is shown relative to the FD range 605 of the training RS for the training phase of the first model. In the exemplary diagram 600, the first model receives input DMRS for training from a FD range that is smaller than the FD range that can be inferred from the trained model.

Figure 6B:
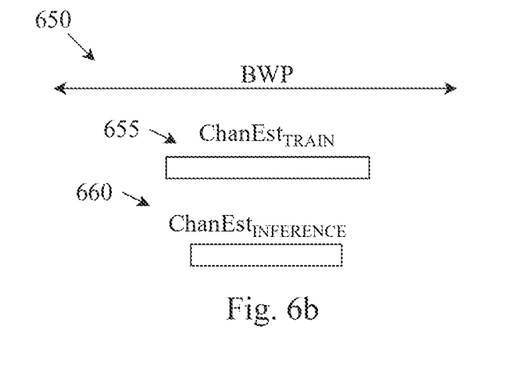
FIG. 6b shows an exemplary diagram for the FD range of the inference phase of a second AI-based channel estimation model.

FIG. 6b shows an exemplary diagram 650 for the FD range 660 of the inference phase of a second AI-based channel estimation model. The FD range 660 is shown relative to the FD range 655 of the training RS for the training phase of the second model. In the exemplary diagram 650, the second model receives input DMRS for training from a FD range that is larger than the FD range that can be inferred from the trained model.

The diagrams 600, 650 of FIGS. 6a-b are provided for illustrative purposes only. As mentioned above, the FD range that may be inferred for a channel estimation from a model trained using a given RS training set may be smaller, larger, or equal to the FD range for the training set.

As part of UE capability signaling, the UE may indicate an FD range that the UE may use for the inference phase of channel estimation. The granularity of this indication may vary. For example, in one embodiment, a single bit may be used to indicate whether the UE is capable of estimating/predicting the channel for FD allocations outside of (larger than) the FD range of the DMRS training set. In another embodiment, a single bit may be used to indicate whether the UE is capable of estimating/predicting the channel for FD allocations inside of (smaller than) the FD range of the DMRS training set. In still other embodiments, the indication of the FD range for inference may be more granular than the embodiments discussed above and may indicate the inference FD range more specifically.

The indication for the inference FD range may be configured relative to the training FD range. For example, the training FD range (FD range for a DMRS training set) may span a set of PRBs, e.g., PRBs 10-20. The inference FD range indication may indicate that the UE can extend inference to FDRAs in the whole BWP comprising the training set.

The UE capability signaling may also include indications for other aspects of the AI-based channel estimation model. For example, the UE may signal an FD range that the UE can use for the training phase of the channel estimation model, a time domain (TD) range for the training phase, a TD range for the inference phase, etc.

When the UE is activated by a user, the UE may enter the inference phase as a default state until a retuning of the channel estimation model is determined to be needed. The retuning comprises a further training phase in which additional training data is input to the AI model and the hyper-parameters of the model are adjusted. The retuning/training phase may require significantly less input data and processing than the initial training and may be performed regularly to improve the performance of the AI model in view of updated training information.

After performing the training phase of the channel estimation model, the UE may enter into the inference phase for some duration of time. However, the channel estimation model may need retuning, i.e., a new training phase, based on various considerations.

According to further exemplary embodiments, various types of signaling may be used between the UE and the gNB to switch between channel estimation modes/phases. For example, the UE may switch into a training/learning-only mode, an inference/estimation-only mode, or a combined training and inference mode. In the combined training and inference mode, the UE simultaneously performs training with a new set of training RS and inference with the previously trained model. Once the new training phase is complete, the UE may switch to inference-only mode using the newly trained model.

In some exemplary embodiments, the UE indicates to the network that retuning is required. The indication may be provided, for example, as part of a new/special CSI report or a new/special SR. The indication may also be provided on-demand, e.g., in a MAC-CE and/or an RRC message. The indication may also indicate that no operation state change is needed, or that the inference phase should be switched to from the training phase.

In a first option, the UE indicates to the network that retuning is required using a special CSI report, referred to herein as CSI for machine learning (CSI4ML). In this option, the network may first configure the UE with a PUCCH resource set in which some of the PUCCH resources are configured with a tag indicating the resources may be used to carry the special CSI report. The tag may be referred to herein as a CSI4ML tag. These resources configured with the CSI4ML tag may then be indicated in downlink control information (DCI), e.g., in a PUCCH resource indicator (PRI).

When the PRI selects the PUCCH resources configured with the CSI4ML tag, the UE may provide the CSI4ML report on these PUCCH resources. For example, the report may be appended to HARQ-ACK bits. In another example, HARQ-ACK bits may be dropped so that the CSI4ML report may be sent.

In a second option, the UE indicates to the network that retuning is required using a special scheduling request (SR), referred to herein as SR for machine learning (SR4ML). In this option, the network may first configure the UE with the SR4ML, which is triggered when the UE determines to request a change of AI/ML operation mode.

Unlike other SRs, a positive SR4ML may have a higher priority than PUSCH with UL-SCH. Thus, in case of a collision between the PUCCH carrying the SR4ML and the PUSCH carrying UL-SCH, the PUSCH is dropped.

In a third option, the UE indicates to the network that retuning is required on-demand. For example, the UE may use a MAC-CE and/or RRC signaling.

The indication (e.g. report) provided by the UE may include additional parameters indicating, e.g., how long training is needed, what DMRS overhead within (and after) learning is desired, etc.

In other exemplary embodiments, the network indicates to the UE that retuning is required. The indication may be provided, for example, as a UE-specific indication, a group common indication, or in a periodic mechanism. The network indication is performed regardless of any initial request by the UE. That is, the network indication may be performed in response to the initial request or may be initiated by the network.

In a first option, the UE is indicated to retune its AI/ML network by a UE-specific indication. The UE-specific indication may comprise, for example, an invalid FDRA allocation, an invalid modulation and coding scheme (MCS), a specific HARQ process number (HPN) (e.g., all 0), a specific redundancy version (RV) (like all 0), a reserved TDRA, a new bit-field, or a new radio network temporary identifier (RNTI). An example of an invalid FDRA is all '0's for FDRA Type 0 or for dynamicSwitch, or all '1's for FDRA Type 1. An example of an invalid MCS is all '1's.

In a second option, the UE is indicated to retune its AI/ML network by a group common (GC) indication, e.g. a GC-DCI. A group of UEs may be indicated to enter (or exit) a specific ML/AI mode, for example, all indicated UEs are signaled to enter AI/ML training mode and receive high density DMRS or CSI-RS.

In a third option, the UE is indicated to retune its AI-ML network in a periodic mechanism, for example via MAC-CE or RRC signaling.

The above embodiments are described relative to UE requests and network indications for retuning, i.e. re-entering the training phase for the channel estimation model. However, a similar mechanism may be used to request and/or indicate a switch from the training phase to the inference phase. In other embodiments, the training phase is configured to last only for a particular duration, and the inference phase is returned to after the duration elapses.

When the UE is indicated to switch the mode (e.g. from inference to learning), the indication may also include parameters indicating when the new state starts, e.g. Nx symbols after DCI indication, and the duration of the new state. The duration may be included in the DCI or may be RRC configured. Alternatively, if the duration of the new state is not indicated, the UE may remain in the indicated mode until further indication is received.

The indicated parameters may also include a DMRS configuration, e.g. density, range in frequency, etc. The Nx parameter may depend, in part, on UE capability, and may also depend on the SCS of the DCI indicating the switch of operation mode.

When the UE is dynamically (or through MAC-CE) indicated to switch the mode, an acknowledgment from the UE may be used. The acknowledgment may allow the UE and the gNB to switch into the new mode at the same time, e.g. if the DMRS overhead and/or data mapping changes when the new mode is switched into.

The acknowledgment may be sent on a PUCCH scheduled by the DCI indicating the mode switch. Alternatively, the acknowledgement may be sent via MAC-CE. The UE is not expected to switch the mode until Ny symbols after the acknowledgment is sent, wherein Ny depends on UE capability and at least the SCS of PUCCH.

Figure 7:
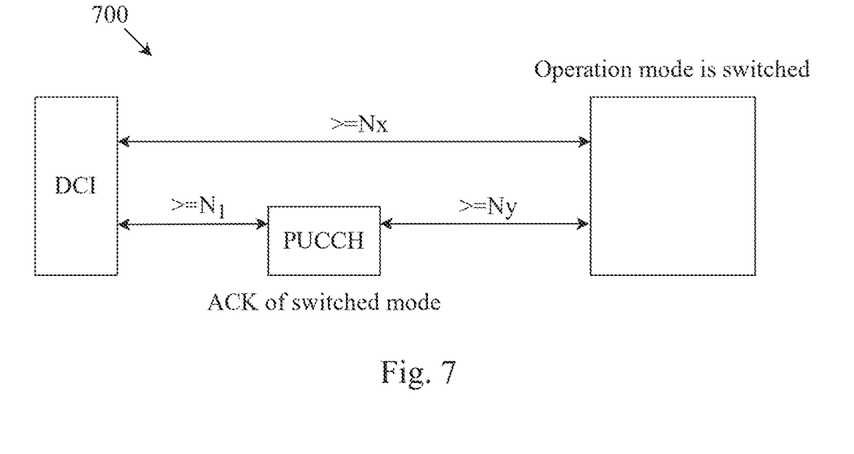
FIG. 7 shows an exemplary diagram for switching an operation mode for AI-based channel estimation.

FIG. 7 shows an exemplary diagram 700 for switching an operation mode for AI-based channel estimation. As shown, the operation mode is switched after Nx symbols indicated in the DCI, and the UE is not expected to switch the mode until Ny symbols after the PUCCH carrying the acknowledgment is transmitted.

Figure 8:
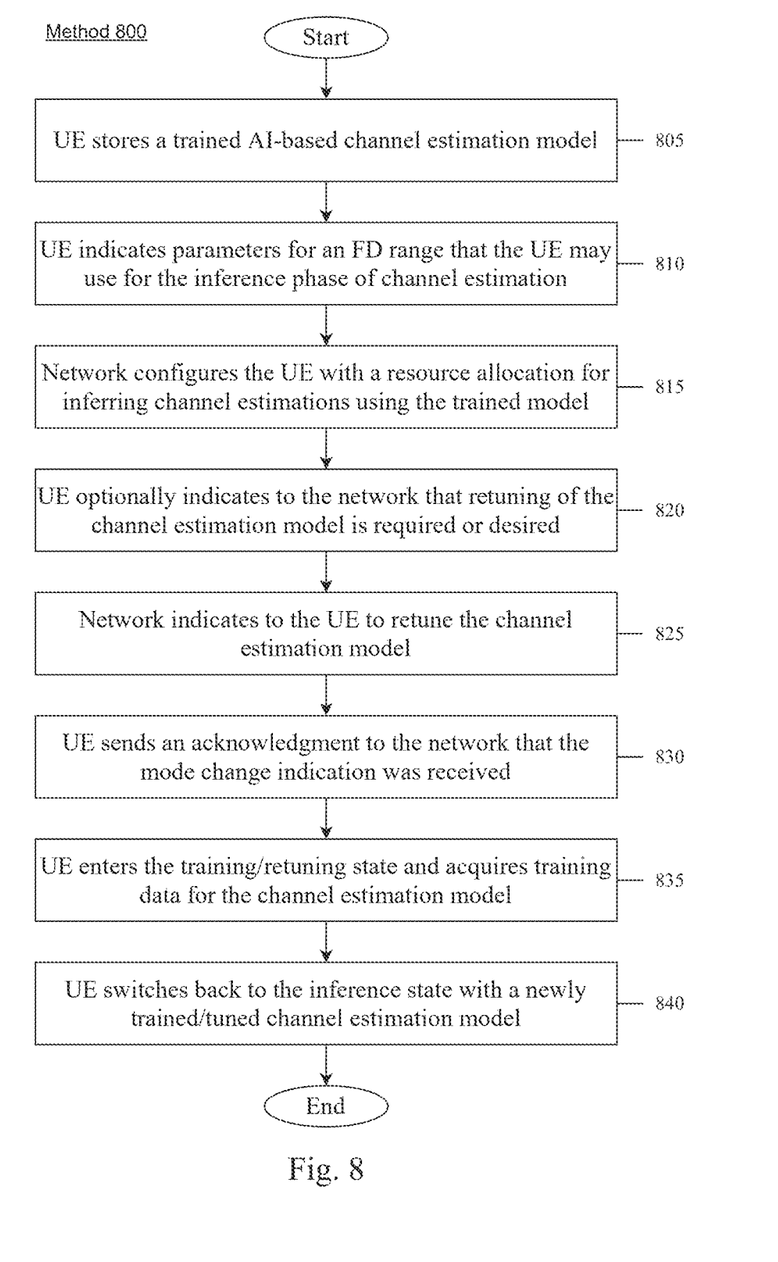
FIG. 8 shows an exemplary method for performing AI-based channel estimation according to various exemplary embodiments described herein.

FIG. 8 shows an exemplary method 800 for performing AI-based channel estimation according to various exemplary embodiments described herein.

In 805, the UE stores a trained AI-based channel estimation model. As discussed above, in some embodiments, the model may be initially trained upon manufacture of the UE, or at some other time prior to user-activation of the UE. Thus, the initial training process and the determination of the model weights may be determined prior to deployment of the UE, wherein some or all of the parameters/hyperparameters for a fully trained model are hard-encoded on the UE.

Once trained, the UE may enter an inference phase/state in which newly received RS are processed using the trained channel estimation model, or some other signal input data is used, and channel estimations/predictions are generated by the trained model without requiring any further channel estimation processes, e.g. MMSE.

When the UE is activated by a user, the UE may enter the inference phase as a default state until a retuning of the channel estimation model is determined to be needed. The re-tuning comprises a further training phase in which additional training data is input to the AI model and the hyperparameters of the model are adjusted. The retuning phase may require significantly less input data and processing than the initial training and may be performed regularly to improve the performance of the AI model in light of updated training information.

In 810, as part of UE capability signaling, the UE indicates parameters for an FD range that the UE may use for the inference phase of channel estimation. As discussed above, depending on factors such as the AI model used by the UE and the implementation details of the UE, the UE may be capable of inferring channel estimations/predictions outside of the FD range carrying the training RS. For example, channel estimations may be inferred for FD ranges including the entire BWP carrying the training RS, other BWPs of the component carrier, or potentially other component carriers.

In other UEs, the UE may be capable of inferring channel estimations/predictions for an FD range that is smaller than (within) the FD range carrying the training RS. For example, the AI model may have a reduced performance for channel estimation at e.g. the edges of the FD range carrying the training data. In still other UEs, the inference range may be equal to the training range.

The FD range may be indicated with various granularities, e.g. different numbers of bits, specifying the FD range in various ways. For example, the indication for the inference FD range may be configured relative to the training FD range, or in other ways.

In 815, the network configures the UE with a resource allocation for inferring channel estimations using the trained model. For example, the resource allocation and the RS configuration may be similar to existing standards. When the UE is in the inference state, the received RS are processed using the trained model and channel estimations are generated therefrom. The configuration may include e.g. a DMRS set spanning an FD range and lasting for a time duration, a DMRS density, etc.

In 820, the UE optionally indicates to the network that retuning of the channel estimation model is required or desired. The indication may be sent to the network using a special CSI report or a special SR, or it may be transmitted on-demand using a MAC-CE or RRC signaling.

In 825, the network indicates to the UE to retune the channel estimation model. The indication may be sent to the UE in a UE-specific DCI, a GC-DCI, or in a periodic manner. The network indication may be transmitted in response to an earlier UE indication that retuning is desired, as described in 820, or the network indication may be initiated independently.

The indication to retune the channel estimation model, i.e. to change from the inference state to the training state, may be accompanied by parameters regarding when the training state starts, the duration of the new state, the DMRS configuration, etc. The additional parameters may be included in the DCI or e.g. RRC configured.

In 830, the UE sends an acknowledgment to the network that the mode change indication was received.

In 835, the UE enters the training/retuning state and acquires training data for the channel estimation model.

In 840, the UE switches back to the inference state with a newly trained/tuned channel estimation model. The UE may re-enter the inference state based on indicated parameters regarding the duration of the training state. If a duration is not provided to the UE, the UE may remain in the training state until a further indication is received from the network.

EXAMPLES

In a first example, a processor of a user equipment (UE) is configured to perform operations comprising operating in a current channel estimation mode comprising either one of a first mode or a second mode, wherein the first mode comprises receiving first reference signals (RS) having a first RS overhead and wherein the second mode comprises receiving second reference signals (RS) having a second RS overhead, receiving a network indication to switch from the current channel estimation mode to a new channel estimation mode comprising the other one of the first mode or second mode, transmitting an acknowledgment to the network that the network indication was received and switching from the current channel estimation mode to the new channel estimation mode in accordance with the network indication.

In a second example, the processor of the first example, wherein the operations further comprise transmitting to the network an indication requesting the switch from the current channel estimation mode to the new channel estimation mode.

In a third example, the processor of the second example, wherein a channel state information (CSI) report for machine learning (CSI4ML) includes the indication requesting the switch.

In a fourth example, the processor of the third example, wherein the operation further comprise receiving a network configuration for physical uplink control channel (PUCCH) resources including a tag indicating the CSI4ML and transmitting the CSI4ML on the PUCCH resources after receiving a PUCCH resource indicator (PCI) selecting the PUCCH resources.

In a fifth example, the processor of the fourth example, wherein the CSI4ML is either appended to HARQ acknowledgment (ACK) bits or the HARQ-ACK bits are dropped.

In a sixth example, the processor of the second example, wherein a scheduling request (SR) for machine learning (SR4ML) includes the indication requesting the switch.

In a seventh example, the processor of the sixth example, wherein the operations further comprise receiving a network configuration for the SR4ML, wherein the SR4ML is triggered when the UE determines to request the switch.

In an eighth example, the processor of the sixth example, wherein the SR4ML has a higher priority than a physical uplink shared channel (PUSCH) and in case of collision the PUSCH is dropped.

In a ninth example, the processor of the second example, wherein a medium access control (MAC) control element (MAC-CE) or a radio resource control (RRC) message includes the indication requesting the switch.

In a tenth example, the processor of the second example, wherein the indication requesting the switch includes further parameters indicating a duration for the new state, an RS overhead during the new state, and an RS overhead after the duration for the new state elapses.

In an eleventh example, the processor of the second example, wherein the network indication to switch from the current channel estimation mode to the new channel estimation mode is transmitted by the network in response to the UE indication requesting the switch.

In a twelfth example, the processor of the first example, wherein the operations further comprise transmitting an indication for a frequency domain (FD) range for which the UE is able to perform channel estimations while operating in the first mode.

In a thirteenth example, the processor of the twelfth example, wherein the FD range is indicated relative to a further FD range that the UE uses to receive the second RSs in the second mode.

In a fourteenth example, the processor of the thirteenth example, wherein the indication for the FD range indicates the FD range comprises an extension of the further FD range.

In a fifteenth example, the processor of the fourteenth example, wherein the FD range is indicated to extend to a whole bandwidth part (BWP) containing the further FD range, a component carrier (CC) containing the further FD range, or another CC.

In a sixteenth example, the processor of the thirteenth example, wherein the indication for the FD range indicates the FD range is within and smaller than the further FD range.

In a seventeenth example, the processor of the twelfth example, wherein the FD range is indicated as part of UE capability signaling.

In an eighteenth example, a processor of a base station is configured to perform operations comprising transmitting a network indication to a user equipment (UE) to switch from a current channel estimation mode comprising either one of a first mode or a second mode to a new channel estimation mode comprising the other one of the first mode or second mode, wherein the first mode comprises receiving first reference signals (RS) having a first RS overhead and wherein the second mode comprises receiving second reference signals (RS) having a second RS overhead, receiving an acknowledgment from the UE that the network indication was received and transmitting RSs in accordance with the new channel estimation mode of the UE.

In a nineteenth example, the processor of the eighteenth example, wherein the operations further comprise receiving from the UE an indication requesting the switch from the current channel estimation mode to the new channel estimation mode.

In a twentieth example, the processor of the nineteenth example, wherein a channel state information (CSI) report for machine learning (CSI4ML) includes the indication requesting the switch.

In a twenty first example, the processor of the twentieth example, wherein the operation further comprise transmitting a network configuration for physical uplink control channel (PUCCH) resources including a tag indicating the CSI4ML and receiving the CSI4ML on the PUCCH resources after transmitting a PUCCH resource indicator (PCI) selecting the PUCCH resources.

In a twenty second example, the processor of the twenty first example, wherein the CSI4ML is either appended to HARQ acknowledgment (ACK) bits or the HARQ-ACK bits are dropped.

In a twenty third example, the processor of the nineteenth example, wherein a scheduling request (SR) for machine learning (SR4ML) includes the indication requesting the switch.

In a twenty fourth example, the processor of the twenty third example, wherein the operations further comprise transmitting a network configuration for the SR4ML, wherein the SR4ML is triggered for the UE when the UE determines to request the switch.

In a twenty fifth example, the processor of the twenty third example, wherein the SR4ML has a higher priority than a physical uplink shared channel (PUSCH) and in case of collision the PUSCH is dropped.

In a twenty sixth example, the processor of the nineteenth example, wherein a medium access control (MAC) control element (MAC-CE) or a radio resource control (RRC) message includes the indication requesting the switch.

In a twenty seventh example, the processor of the nineteenth example, wherein the indication requesting the switch includes further parameters indicating a duration for the new state, an RS overhead during the new state, and an RS overhead after the duration for the new state elapses.

In a twenty eighth example, the processor of the nineteenth example, wherein the network indication to switch from the current channel estimation mode to the new channel estimation mode is transmitted by the base station in response to the UE indication requesting the switch.

In a twenty ninth example, the processor of the eighteenth example, wherein the operations further comprise receiving an indication for a frequency domain (FD) range for which the UE is able to perform channel estimations while operating in the first mode.

In a thirtieth example, the processor of the twenty ninth example, wherein the FD range is indicated relative to a further FD range that the UE uses to receive the second RSs in the second mode.

In a thirty first example, the processor of the thirtieth example, wherein the indication for the FD range indicates the FD range comprises an extension of the further FD range.

In a thirty second example, the processor of the thirty first example, wherein the FD range is indicated to extend to a whole bandwidth part (BWP) containing the further FD range, a component carrier (CC) containing the further FD range, or another CC.

In a thirty third example, the processor of the thirtieth example, wherein the indication for the FD range indicates the FD range is within and smaller than the further FD range.

In a thirty fourth example, the processor of the twenty ninth example, wherein the FD range is indicated as part of UE capability signaling.

In a thirty fifth example, a user equipment (UE) comprises a transceiver configured to communicate with a wireless network and a processor communicatively coupled to the transceiver and configured to perform operations comprising operating in a current channel estimation mode comprising either one of a first mode or a second mode, wherein the first mode comprises receiving first reference signals (RS) having a first RS overhead and wherein the second mode comprises receiving second reference signals (RS) having a second RS overhead, receiving a network indication to switch from the current channel estimation mode to a new channel estimation mode comprising the other one of the first mode or second mode, transmitting an acknowledgment to the network that the network indication was received and switching from the current channel estimation mode to the new channel estimation mode in accordance with the network indication.

In a thirty sixth example, a base station comprises a transceiver configured to communicate with a user equipment (UE) and a processor communicatively coupled to the transceiver and configured to perform operations comprising transmitting a network indication to the UE to switch from a current channel estimation mode comprising either one of a first mode or a second mode to a new channel estimation mode comprising the other one of the first mode or second mode, wherein the first mode comprises receiving first reference signals (RS) having a first RS overhead and wherein the second mode comprises receiving second reference signals (RS) having a second RS overhead, receiving an acknowledgment from the UE that the network indication was received and transmitting RSs in accordance with the new channel estimation mode of the UE.

Those skilled in the art will understand that the above-described exemplary aspects may be implemented in any suitable software or hardware configuration or combination thereof. An exemplary hardware platform for implementing the exemplary aspects may include, for example, an Intel x86 based platform with compatible operating system, a Windows OS, a Mac platform and MAC OS, a mobile device having an operating system such as iOS, Android, etc. In a further example, the exemplary aspects of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It will be apparent to those skilled in the art that various modifications may be made in the present disclosure, without departing from the spirit or the scope of the disclosure.

Thus, it is intended that the present disclosure cover modifications and variations of this disclosure provided they come within the scope of the appended claims and their equivalent.

What is claimed:

1. An apparatus comprising memory coupled to processing circuitry, the processing circuitry configured to:
operate a user equipment (UE) in a current channel estimation mode comprising either one of a first mode or a second mode, wherein the first mode is a training mode for an artificial intelligence (AI) based channel estimation model comprising receiving first reference signals (RS) having a first RS overhead and wherein the second mode is an inference mode for the AI-based channel estimation model comprising receiving second reference signals (RS) having a second RS overhead;
process, based on signaling from a network, an indication to switch from the current channel estimation mode to a new channel estimation mode comprising the other one of the first mode or second mode;
generate, for transmission to the network, an acknowledgment that the indication was received; and
switch from the current channel estimation mode to the new channel estimation mode in accordance with the indication.

2. The apparatus of claim 1, wherein the current channel estimation mode is the inference mode and the indication indicates the UE to retune the AI-based channel estimation model by entering the training mode.

3. The apparatus of claim 1, wherein the indication comprises a UE-specific indication to switch the current channel estimation mode.

4. The apparatus of claim 1, wherein the indication comprises a group common downlink control information (GC-DCI), wherein the GC-DCI indicates each one of a group of UEs to switch the current channel estimation mode.

5. The apparatus of claim 1, wherein the indication to switch the current channel estimation mode further comprises an indication for a timing offset Nx for a start of the new channel estimation mode and an indication of an RS configuration for the new channel estimation mode including a density and a frequency domain (FD) range for the RSs.

6. The apparatus of claim 5, wherein the indication to switch the current channel estimation mode further comprises an indication for a duration of the new channel estimation mode.

7. The apparatus of claim 5, wherein the operations further comprise:
remaining in the new channel estimation mode until a further indication is received to switch back to the current channel estimation mode.

8. The apparatus of claim 1, wherein the acknowledgment is transmitted on a physical uplink control channel (PUCCH) scheduled by a downlink control information (DCI) carrying the indication to switch the current channel estimation mode.

9. The apparatus of claim 1, wherein the UE is not expected to switch to the new channel estimation mode until Ny symbols after the acknowledgment is transmitted.

10. An apparatus comprising memory coupled to processing circuitry, the processing circuitry configured to: generate, for transmission to a user equipment (UE), a network indication to switch from a current channel estimation mode comprising either one of a first mode or a second mode to a new channel estimation mode comprising the other one of the first mode or second mode, wherein the first mode is a training mode for an artificial intelligence (AI) based channel estimation model comprising receiving first reference signals (RS) having a first RS overhead and wherein the second mode is an inference mode for the AI-based channel estimation model comprising receiving first reference signals (RS) having a first RS overhead and wherein the second mode is an inference mode for the AI-based channel estimation model comprising receiving second reference signals (RS) having a second RS overhead;
process an acknowledgment from the UE that the network indication was received; and
generate, for transmission to the UE, RSs in accordance with the new channel estimation mode of the UE.

11. The apparatus of claim 10, wherein the current channel estimation mode is the inference mode and the network indication indicates the UE to retune the AI-based channel estimation model by entering the training mode.

12. The apparatus of claim 10, wherein the network indication comprises a UE-specific indication to switch the current channel estimation mode.

13. The apparatus of claim 10, wherein the network indication comprises a group common downlink control information (GC-DCI), wherein the GC-DCI indicates each one of a group of UEs to switch the current channel estimation mode.

14. The apparatus of claim 10, wherein the network indication to switch the current channel estimation mode further comprises an indication for a timing offset Nx for a start of the new mode and an indication of an RS configuration for the new mode including a density and a frequency domain (FD) range for the RSs.

15. The apparatus of claim 14, wherein the network indication to switch the current channel estimation mode further comprises an indication for a duration of the new channel estimation mode.

16. The apparatus of claim 14, wherein the operations further comprise:
transmitting a further network indication to the UE to switch back to the current channel estimation mode.

17. The apparatus of claim 10, wherein the acknowledgment is received on a physical uplink control channel (PUCCH) scheduled by a downlink control information (DCI) carrying the network indication to switch the current channel estimation mode.

18. The apparatus of claim 10, wherein the UE is not expected to switch to the new channel estimation mode until Ny symbols after the acknowledgment is transmitted.

* * * * *